United States Patent [19]
Bennion et al.

[11] Patent Number: 4,795,226
[45] Date of Patent: Jan. 3, 1989

[54] OPTICAL FIBRE REFLECTIVE DIFFRACTION GRATING DEVICES

[75] Inventors: Ian Bennion; Christopher J. Rowe, both of Northampton; Douglas C. J. Reid, Warwickshire, all of Great Britain

[73] Assignee: Plessey Overseas Limited, Ilford, England

[21] Appl. No.: 905,722

[22] Filed: Sep. 9, 1986

[30] Foreign Application Priority Data

Sep. 10, 1985 [GB] United Kingdom ............... 8522428
Sep. 28, 1985 [GB] United Kingdom ............... 8523981

[51] Int. Cl.⁴ .......................... G02B 6/26; G02B 6/34; G02B 5/18; G03G 13/06
[52] U.S. Cl. ............................. 350/96.15; 350/96.19; 350/162.2; 430/97
[58] Field of Search ............... 350/96.13, 96.14, 96.15, 350/96.17, 96.19, 162.2; 430/97, 126

[56] References Cited

U.S. PATENT DOCUMENTS

| | | | |
|---|---|---|---|
| 3,908,121 | 9/1975 | Riseberg et al. | 250/199 |
| 3,912,363 | 10/1975 | Hammer | 350/96.12 |
| 4,314,283 | 2/1982 | Kramer | 350/96.19 X |
| 4,400,056 | 8/1983 | Cielo | 350/96.19 |
| 4,444,460 | 4/1984 | Stowe | 350/96.19 |
| 4,482,207 | 11/1984 | Thomas | 350/162.17 X |
| 4,525,818 | 6/1985 | Cielo et al. | 350/96.29 |
| 4,588,255 | 5/1986 | Tur et al. | 350/96.16 |
| 4,601,541 | 7/1986 | Shaw et al. | 350/96.15 X |
| 4,622,663 | 11/1986 | Ishikawa et al. | 350/96.15 X |
| 4,636,031 | 1/1987 | Schmadel, Jr. et al. | 350/96.19 |
| 4,673,241 | 6/1987 | Nishinaki et al. | 350/3.64 |

*Primary Examiner*—William L. Sikes
*Assistant Examiner*—Akm E. Ullah
*Attorney, Agent, or Firm*—Michael F. Oglo; Julian C. Renfro

[57] ABSTRACT

An optical device comprising a length of optical fibre of predetermined convex configuration supported by fibre mounting and/or attachment means, the convex outer part of the optical fibre having a portion thereof removed therefrom closely adjacent to or even just entering the core of the optical fibre to produce a substantially flat surface therealong on which a reflective diffraction grating of predetermined form is provided according to the function requirements of the device.

2 Claims, 1 Drawing Sheet

OPTICAL FIBRE REFLECTIVE DIFFRACTION GRATING DEVICES

BACKGROUND OF THE INVENTION

This invention relates to optical devices and relates more specifically to optical devices for the qualitative and/or quantitative reflection of light travelling along an optical fibre. Such optical devices may be used as sensors (e.g. temperature sensors), reflectors or mirrors (e.g. partially reflective) or they may be used in or for guided wavelength filters, so-called external cavity mode stabilisation of injection lasers and phase match non-linear interactions.

SUMMARY OF THE INVENTION

According to a first feature of the present invention there is provided an optical device comprising a length of optical fibre of predetermined convex configuration supported by fibre mounting and/or attachment means, the convex outer part of the optical fibre having a portion thereof removed therefrom closely adjacent to or even just entering the core of the optical fibre to produce a substantially flat surface therealong on which a reflective diffraction grating of predetermined form is provided according to the function requirements of the device.

In carrying out the first feature of the present invention the optical lines or corrugations of the diffraction grating will be disposed orthogonally relative to the direction of light propagation along the optical fibre so that a beam of light having a wavelength $\lambda g = 2V$, where V equals the grating period, will undergo Bragg diffraction as it impinges on the grating and the diffracted beam will be guided by the optical fibre back along the incident path. The percentage of light reflected may be controlled by the number and/or depth of the corrugations and/or the number and optical density of the lines of the diffraction grating, as the case may be. The reflected percentage of the light could be 100% and since the mode of operation is diffractive the device exhibits strong wavelength selectivity with only a narrow band of wavelengths centred on $\lambda g$ being strongly reflected whilst all other wavelengths pass through the grating without significant attenuation thereof. The wavelength response of the device may include side lobes giving reduced reflectivity at wavelengths corresponding to multiples of $\lambda g$ but these are of relatively small amplitude or intensity and the depth of the grating corrugations or the optical density o the grating lines can be adjusted in order to reduce the side lobe intensities to insignificant levels.

The diffraction grating may be produced by applying photoresist material to the aforesaid substantially flat surface of the optical fibre and then exposing the material to a suitable interference pattern derived from laser means. Following the development of the photoresist material the grating is formed as a depth modulation of the photoresist and it may be used in this form or it may alternatively be transferred into the optical fibre itself by the use of an ion-beam milling technique.

Alternatively, the diffraction grating may be produced by exposing photochromic material dissolved in a suitable matrix and applied to the aforesaid flat surface of the optical fibre to interfering laser beams which accordingly produce a modulation of the refractive index of the photochromic material along the grating surface.

According to a second feature of the present invention a plurality of such optical devices may be optically interconnected to provide inter alia a series of partially reflective mirrors eminently suitable for incorporation in optical hydrophones or other optical systems for sensing strain or deformation of optical fibres according to our British Patent No. 2136113B in which optical fibre means is arranged to be subjected to fibre deforming forces during use of the system and means is provided for producing a coherent signal for transmission along the optical fibre means, in which the optical fibre means comprises at points along its length respective discontinuities from which a light signal being transmitted along the optical fibre means will be partially reflected back along the fibre means and combined with the light signal being transmitted down the optical fibre means so that heterodyning occurs between the interfering signals and in which the combined light signals are applied to demodulation means which provides an output indicative of the acoustic or other deforming force acting on the optical fibre means.

The discontinuities provided along the length of the optical fibre may be provided in accordance with the second feature of the present invention by a plurality of optical devices of the form described above and introduced at predetermined points along the length of the optical fibre common to all the optical devices.

For the fabrication of an optical sensing arrangement according to the present invention an optical fibre mounting and/or attachment means is provided having formed in a surface thereof a plurality of curved grooves for receiving spaced apart relatively short lengths or portions of a common optical fibre, the short lengths of the optical fibre then being secured as by adhesive within the curved grooves so that the short lengths of optical fibre have a convex configuration after which the grooved surface of the mounting and/or attachment means is polished or pared away to remove part of the outer convex surface of the lengths of optical fibre within the curved grooves closely adjacent to or just entering the core of the optical fibre to produce substantially flat surfaces therealong and diffraction gratings are then provided on the plurality of flat surfaces to define reflective points along the optical fibre and the fibre mounting and/or attachment means is finally divided up into separate parts so that a plurality of optical devices are effectively distributed along the length of the common optical fibre.

The optical fibre mounting and/or attachment means may comprise a plurality of grooved blocks of glass or silica, for example, bonded together prior to winding the optical fibre around the bonded structure so that portions of the fibre engage the curved grooves in which they may be cemented as by UV setting cement for example.

It may here be mentioned that the second feature of the present invention enables a plurality of partially or totally reflective discontinuities to be introduced into an optical fibre by a single operation and without the need to sever and rejoin the ends of the optical fibre after insertion of suitably reflective components or reflective coatings between the fibre ends. The latter known techniques introduce undesirable optical losses and complexity (e.g. the need for precision alignment of the fibre ends etc.) into the production of optical hydrophones of the kind having partially reflective discontinuities along a sensing fibre.

By way of example the present invention will now be described with reference to the accompanying drawings in which:

DETAILED DESCRIPTION OF THE INVENTION

Figure 1:
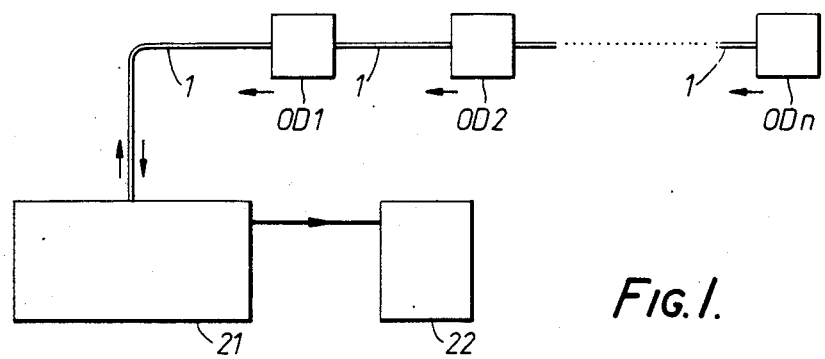
FIG. 1 shows a simple block schematic diagram of an optical hydrophone including an optical fibre sensor arrangement.

Referring to the drawings, FIG. 1 shows an optical hydrophone according to our British Patent No. 2136113B. The optical fibre sensor arrangement of the hydrophone comprises an optical fibre 1 having at predetermined intervals along its length partially reflective discontinuities provided by optical devices OD1 to ODN. In operation of the hydrophone as is more fully described in the above-mentioned patent a light signal is launched into one end of the optical fibre 1 from coherent light signal generating means 21 and light reflected back along the optical fibre from the discontinuities interferes with the transmitted light to produce signals which can be processed (e.g. demodulated) by receiver/detector means 22 to derive an indication of acoustic forces acting on the optical fibre 1 along its length.

Figure 2:
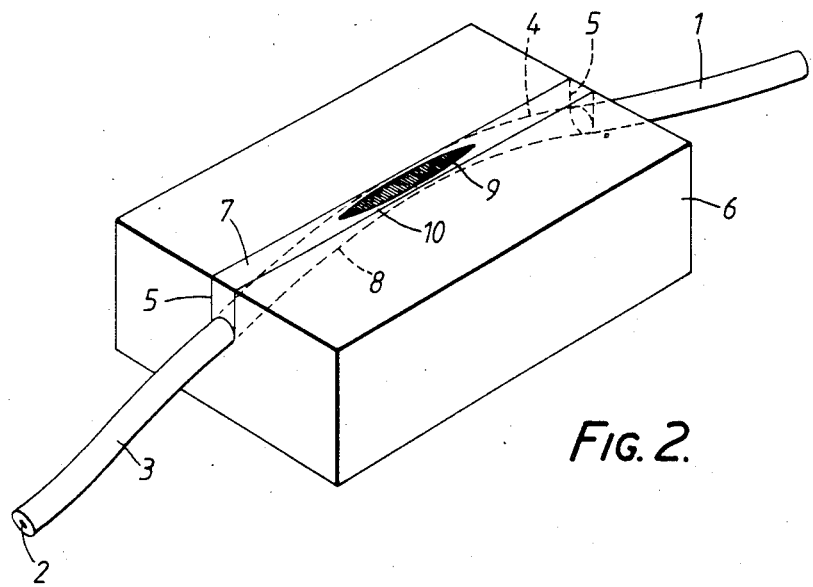
FIG. 2 illustrates the method of fabricating the optical sensor arrangement shown in FIG. 1; and, FIG. 3 is a perspective view of one of the optical devices which are spaced along the sensing fibre shown in FIG. 1.

Referring now to FIG. 2 of the drawings, the optical device, such as the device OD1 in FIG. 1, comprises a monomode optical fibre 1 provided with a core 2 and cladding 3. A portion 4 of the optical fibre 1 is accommodated within a curved groove or slot 5 formed in a mounting or support block structure 6 of glass or silica for example. The groove or slot 5 which will be of a predetermined radius (e.g. 0.5 to 1.5 m) may, for example, be produced by the use of a diamond saw-blade. To perform the cutting operation the block structure 6 may be mounted on a pivotable arm of adjustable length (not shown). By selecting the length of the arm and the position of the pivot relative to the saw-blade a groove of predetermined depth and curvature may be cut. By the use of an adhesive cement 7 (e.g. UV setting epoxy resin) the optical fibre portion 4 is secured to the convex surface 8 of the block structure 6 so that the fibre portion 4 is of convex configuration and the adhesive cement also fills the groove or slot 5 as shown.

In order to produce a diffraction grating 9 on the optical fibre portion 4 the outer surface of the mounting block structure 6, as viewed in the drawing, will have previously been polished or pared away to a sufficient depth to produce a substantially flat surface 10 on the fibre portion 4. The polishing may extend through the cladding 3 of the optical fibre to within approximately 1 $\mu$m of the fibre core 2 and it may even just penetrate the core itself.

Having produced the flat polished surface 4 the surface may then be coated with a photo-resist (e.g. positive photo-resist marketed under the product name Shipley AZ1350) which is then exposed to a two beam interference pattern derived from a laser (e.g. argon laser in the case of the specific positive photo-resist mentioned above).

After developing the exposed photo-resist the grating 9 is formed as a depth modulation which may, if desired, be transferred into the optical fibre material by means of an ion-beam milling procedure.

As an alternative method of producing the grating 9 photochromic material dissolved in a suitable matrix may be applied to the flat optical fibre surface 10 and then exposed to the two beam laser interference pattern in order to produce modulation of the refractive index of the photochromic material. In this way diffraction lines or stripes of varying optical density are produced to produce periodic variation of the refractive index.

In fabricating the diffraction grating of the optical device described it will be arranged that the grating period $V = \lambda g/2$ where $\lambda g$ is the wavelength of the light within the fibre which is required to be reflected (e.g. selectively) back along the fibre.

Figure 3:
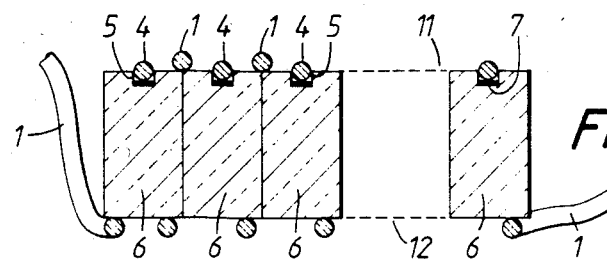

In order to provide a plurality of optical devices of the form shown in FIG. 2 spaced at intervals along the optical fibre 1 without severing the optical fibre and in one simultaneous overall operation thereby simplifying the fabrication whilst keeping optical losses within the fibre to a negligible level, a plurality of grooved block mounting structures 6 may be bonded together as shown in FIG. 3. The curved grooves 5 of the structure are arranged in the upper surface 11 of the bonded structure 12 as shown. The optical fibre 1 is then wound around the bonded block structure 12 so that portions 4 of the optical fibre 1 at the appropriate locations along the fibre length engage the curved grooves 5. The optical fibre portions 4 are then cemented into the grooves 5, as by using UV setting epoxy resin cement 7.

As can be appreciated, the curved convex outer surfaces of the optical fibre portions 4 protrude above the surface 11 of the bonded structure 12. These protruding surfaces of the fibre and the upper surface of The block are then polished or pared down to provide substantially flat surfaces along the fibre as shown at 10 in FIG. 2 at which diffraction grating 9 (FIG. 2) are formed on each surface in the manner already described with reference to FIG. 2. However, it may here be mentioned that the reflectivities of the respective diffraction gratings could be varied by exposing the photo-resist or photochromic material, as the case may be, to the interfering pattern from the laser beams through a suitably graded filter.

The block structure 12 is finally divided into separate blocks 6 which will be distributed along the optical fibre 1.

It will of course be appreciated that the block structure 12 could take alternative forms and could, alternatively, be of unitary form and subsequently cut into sections after fabrication of the optical device assembly has been completed.

Although in the foregoing description the optical devices are partially reflective, in other applications, such as wavelength filtering the reflective percentage will be high (e.g. 100%) in order to ensure that a particular wavelength or narrow band of wavelengths will be reflected back along the fibre whilst other wavelengths pass through the grating.

We claim:

1. An optical system for sensing variable deformation of an optical fibre, said system comprising means for producing coherent light signals for propagation along the optical fibre, reflective means located at distributed points along the optical fibre for partially reflecting said propagating coherent light signals back along the optical fibre so that the partially reflected light combines with the light propagating along the fibre to produce interference signals and demodulation means for receiving said interference signals to provide an output indicative of deformation forces acting on the optical fibre at the distributed points therealong, in which the distributed reflective means are formed along an optical fibre wound around a grooved mounting block having curved grooves formed thereon which receive spaced apart relatively short lengths of the optical fibre which are secured in the curved grooves, the grooved surface of the mounting block being pared away so that parts of the outer convex surfaces of the short lengths of the optical fibre are removed thereby to provide flat surfaces at least closely adjacent the core of the optical fibre, in which a diffraction grating is formed on each of said flat surfaces of the optical fibre to provide reflective means along the fibre and in which the mounting block is divisible into a plurality of parts each of which includes a portion of the optical fibre having a diffraction grating associated with it to define one of the said distributed reflective means along the optical fibre.

2. An optical system as claimed in claim 1, in which the mounting block is of rectangular form having the curved grooved provided in one surface thereof and in which the relatively short lengths of the optical fibre are cemented into the grooves.

* * * * *